United States Patent [19]

Aichele

[11] Patent Number: 4,779,048
[45] Date of Patent: Oct. 18, 1988

[54] METAL DETECTOR FOR DETECTING METAL OBJECTS

[75] Inventor: Gerd Aichele, Reutlingen, Fed. Rep. of Germany

[73] Assignee: Vallon GmbH, Fed. Rep. of Germany

[21] Appl. No.: 925,267

[22] Filed: Oct. 31, 1986

[30] Foreign Application Priority Data

Nov. 2, 1985 [EP] European Pat. Off. ............ 85113952

[51] Int. Cl.$^4$ .............................................. G01B 7/14
[52] U.S. Cl. ...................... 324/207; 324/225; 324/226; 340/547
[58] Field of Search ............... 324/207, 208, 225–227, 324/232, 233, 239–243, 260–262, 326–329, 67; 340/540, 541, 547, 551

[56] References Cited

U.S. PATENT DOCUMENTS

| 3,526,886 | 9/1970 | Lubich | 324/243 X |
| 3,665,449 | 5/1972 | Elder et al. | 324/243 X |
| 3,676,772 | 7/1972 | Lee | 324/233 |
| 3,697,972 | 10/1972 | Brown | 324/243 X |
| 3,758,849 | 9/1973 | Susman et al. | 324/243 X |
| 3,763,424 | 10/1973 | Bennett, Jr. et al. | 340/551 X |
| 3,983,552 | 9/1976 | Bakeman, Jr. et al. | 340/551 X |
| 4,053,828 | 10/1977 | Ambler et al. | 324/239 |
| 4,063,230 | 12/1977 | Purinton et al. | 324/233 X |
| 4,075,553 | 2/1978 | Bouverot et al. | 324/233 |
| 4,144,756 | 3/1979 | Linder | 73/290 R |
| 4,394,645 | 7/1983 | Humble et al. | 340/551 X |

Primary Examiner—Reinhard J. Eisenzopf
Assistant Examiner—Warren S. Edmonds
Attorney, Agent, or Firm—Bachman & LaPointe

[57] ABSTRACT

A metal detector is proposed, in which field coils and receiving coils are arranged on either side of a zone to be monitored. In order to bring about a more uniform sensitivity distribution within the zone to be monitored, alternately the field coil on one side and the field coil on the other side is excited for radiating a magnetic field.

4 Claims, 2 Drawing Sheets

METAL DETECTOR FOR DETECTING METAL OBJECTS

BACKGROUND OF THE INVENTION

The present invention relates to a metal detector for detecting metal objects according to the preamble of claim 1.

Metal detectors are used in numerous different fields and are based on the measurement of changes to the electromagnetic field, which are brought about by metal objects located in a zone to be monitored. Metal detectors are used in the security field, for checking passengers at airports and for checking visitors in particularly highly protected buildings or installations. Metal detectors are also used for a wide range of purposes in industry.

DE-OS 32 28 447 discloses a metal detector for detecting metal objects, in which a field coil is excited in pulsed manner and the field influencing is determined and/or measured by two receiving coils connected back to back and a series-connected evaluation means. particularly when used in so-called door frames, through which pass the persons to be checked, a metal object to be detected can be either moved very closely passed the field coil or the receiving coils. However, as the sensitivity decreases with increasing distance from the receiving coils and reaches its minimum at the field coils in this arrangement, different test signals can occur in the receiving coils as a function of the position of the metal object.

SUMMARY OF THE INVENTION

The problem of the present invention is to obtain a more uniform sensitivity within the zone to be checked.

According to the invention, this problem is solved by the features given in the main claim. On two opposite sides of the zone to be monitored are arranged in each case one field coil and receiving coils, the receiving coils of one side being intended for the reception and evaluation of the magnetic field, which is produced by the field coil on the opposite side. The field coils and the in each case facing receiving coils can be successively activated in short time intervals for measurement in pulse operations, so that in corresponding alternations the maximum sensitivity firstly occurs on one side and then on the other. It is also possible to simultaneously pulsate both field coils and then the receiving coils are also simultaneously actively connected.

The interconnected receiving coils of each side, as well as the field coils can in each case be connected to a resonant circuit, so that a pulsed excitation of the field coil leads to a decaying oscillation and a corresponding decaying magnetic field. The receiving coils form a tuned resonant circuit, which is tuned to the transmitting frequency.

The receiving loops on each of the two sides of the zone to be monitored are essentially arranged in the same plane as the spatially associated field coil and subdivide the surface surrounded by the field coil into two identical, juxtaposed halves. A person to be checked passes through the monitored zone in such a way that he initially moves passed one receiving coil and then passed the receiving coil next to it. The currents induced in the receiving coils are compared in the evaluation means and are indicated or released a signal on exceeding a threshhold value.

In order to avoid damping of the exciting field, the receiving coils can be separated on the output side for as long as the field coil spatially associated therewith radiates a magnetic field. In this case only the receiving coils facing the corresponding field coil are activated.

In place of separate field coils, it is also possible to use two juxtaposed loops both as field coils and as receiving coils. For radiating the magnetic field, the loops are then connected in series, whilst in receiving operation they are oppositely connected.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
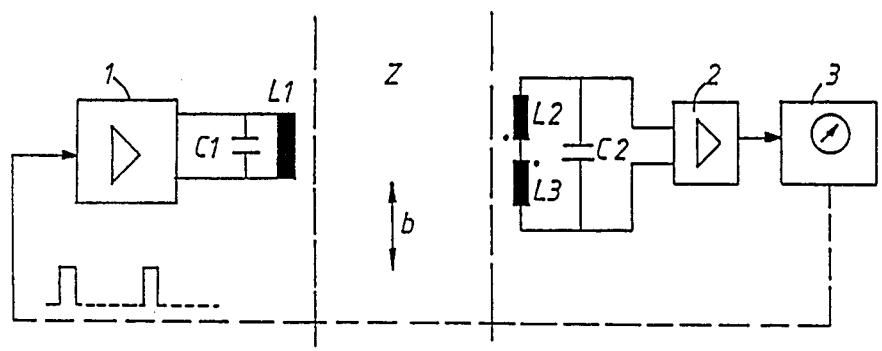
FIG. 1 A simplified known circuit.

In the case of the known metal detector shown in FIG. 1, the zone Z to be monitored is bounded by lateral, interrupted lines. On one side there is a field coil L1, which together with a capacitor C1 forms a resonant circuit, which is pulsated in time intervals by means of an amplifier 1. On the other side are provided two receiving coils L2, L3 which are connected back to back and which also form a resonant circuit together with a capacitor C2. A measuring amplifier 2 supplies the signals occurring on the reception side to an evaluation means 3, which provides an analogue reading or supplies a signal on exceeding a threshold. An arrow B indicates the movement direction of the persons to be monitored or the metal objects to be detected.

Figure 2:
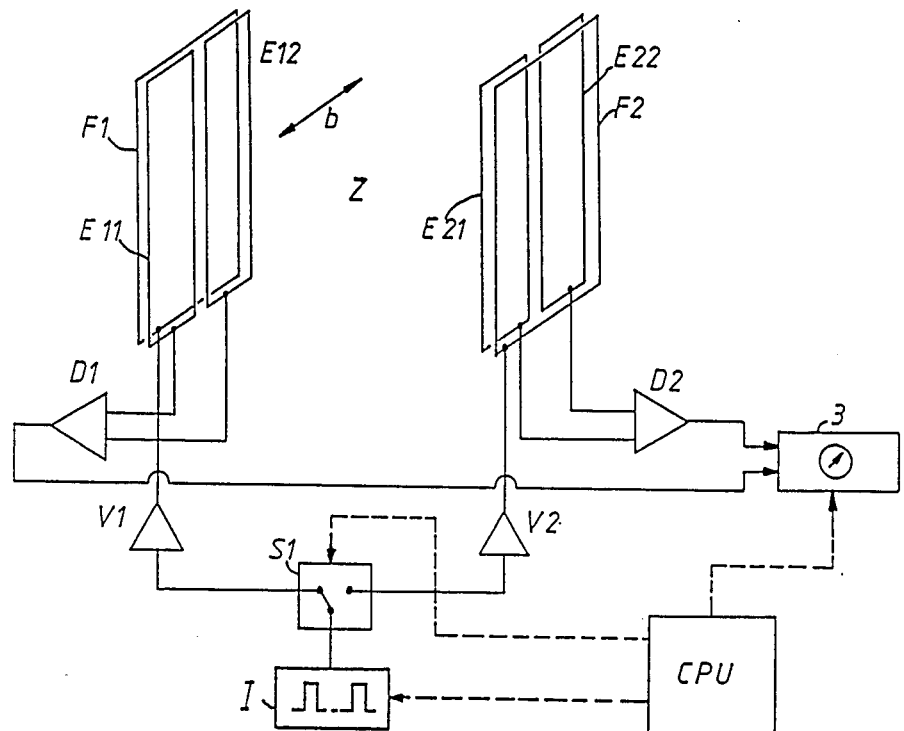
FIG. 2 The block circuit diagram of a metal detector according to the invention.

The block diagram circuit shown in FIG. 2 shows a metal detector, in which on either side of zone Z there is a field coil F1, F2 and two receiving coils E11 and E12, E21, E22. The field coils are alternately excited by exciting pulses to radiate a magnetic field by means of a changeover switch S1 and following amplifiers V1 and V2. A central control unit CPU for this purpose controls a pulse generator I which, at its output and via switch S1, supplies field coil F1 with exciting pulses across amplifier V1. If the central control unit CPU brings switch S1 into the other, not shown position, then the next exciting pulse passes across amplifier V2 to field coil F2. The signals received at receiving coils E11, E12, E21, E22, which are in each case oppositely connected are supplied across differential amplifiers D1, D2 to an evaluation means 3. The test signals transmitted by differential amplifiers D1, D2 to evaluation means 3 can be processed alternately or simultaneously in evaluation means 3. As a function of the particular application, it is also possible to process the sum of the test signals in evaluation means 3 and display the same.

Figure 4:
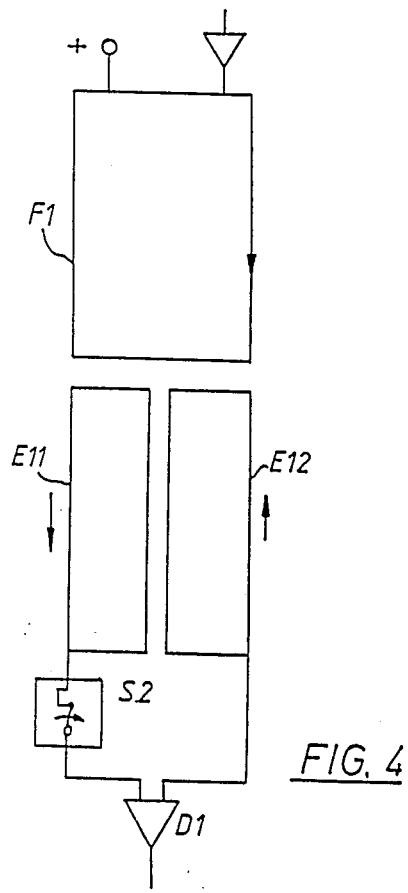
FIG. 4 An arrangement with separable receiving coils.

It is also possible to separate on the input side differential amplifiers D1 and D2 during the times when the spatially associated field coil radiates a magnetic field. This possibility is indicated in FIG. 4 by a controllable switch S2. For ease of representation in FIG. 4, field coil F1 and receiving coils E11, E2 are shown below one another, but in reality the loops of receiving coils E11, E12 cover the surface enclosed by the loop of field coil F1, as shown in FIG. 2.

Figure 3:
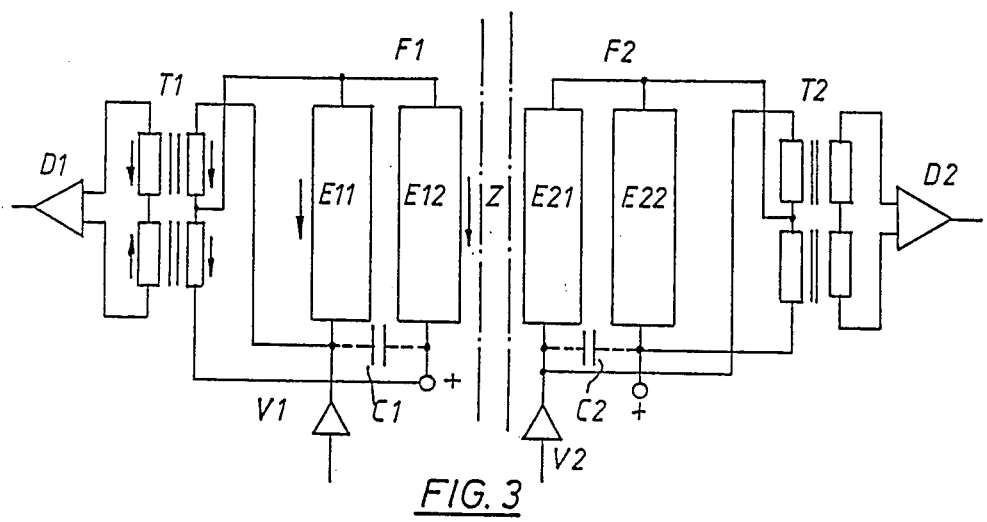
FIG. 3 A construction modified with respect to the coils.

FIG. 3 shows a special arrangement of receiving coils E11-E22, which are so connected to transformers T1, T2, that the coils connected in series act as field coils F1, F2 on feeding in via amplifiers V1, V2, whilst the same coils are oppositely coupled by means of transformers T1, T2, so that there differential voltages are supplied to the inputs of differential amplifiers D1, D2. The current path in the coils and the voltage drop at the transformers is indicated on the left-hand side by arrows.

The capacitors C1, C2 indicated below the coils can be provided if a resonant circuit together with the associated coils is to be formed and as is the case with the circuit shown in FIG. 1.

It is also pointed out that FIG. 4 only shows one arrangement with field coil F1 and receiving coils E11, E12, although an arrangement according to FIG. 2 is provided on both opposite sides of the zone to be monitored. It is fundamentally also possible to provide an arrangement according to FIG. 4 on only one side of the zone to be monitored, in which the receiving coils E11, E12 directly associated with field coil F1 are used for detecting the magnetic field change caused by the metal object. Such an arrangement can more particularly be used if for space reasons, it can be insured that the metal objects will pass very close to the coils. If widely differing sensitivities can be allowed, such a one-sided arrangement can also be used for monitoring wider zones.

What is claimed is:

1. A metal detector for detecting metal objects which may be used as part of a door frame through which people pass, said detector comprising:

a first field coil and two receiving coils positioned on a first side of a zone to be monitored;

a second field coil and two additional receiving coils positioned on a second side of said zone opposed to said first side;

each said field coil being activated by a means for exciting short pulses; and evaluation means connected to said receiving coils for indicating the presence of a metal object within said zone being monitored, wherein said first field coil radiates a first magnetic field to be received by said additional receiving coils on said second side and said second field coil radiates a second magnetic field to be received by said receiving coils on said first side and wherein said field coils are activated in at least one manner selected from the group of simultaneous activation of said field coils and successive activation of said field coils in short intervals.

2. A metal detector according to claim 1 wherein each field coil is formed by a spatially associated transmitting loop having a desired area and each said receiving coil surrounds an area equal to approximately half of said loop area and wherein said receiving coils on each said are juxtaposed with respect to each other.

3. A metal detector according to claim 1 which further comprises means for separating the pulses received by each receiving coil on one of said sides.

4. A metal detector according to claim 1 wherein said field coil and said receiving coils on each said of said zone are formed by two juxtaposed loops, said loops serving as said field coil when connected in series and serving as said receiving coils when oppositely connected.

* * * * *